Oct. 21, 1969 L. R. YOUNG ET AL 3,473,868
EYE POSITION AND MOVEMENT MONITOR
Filed April 27, 1967 2 Sheets-Sheet 1
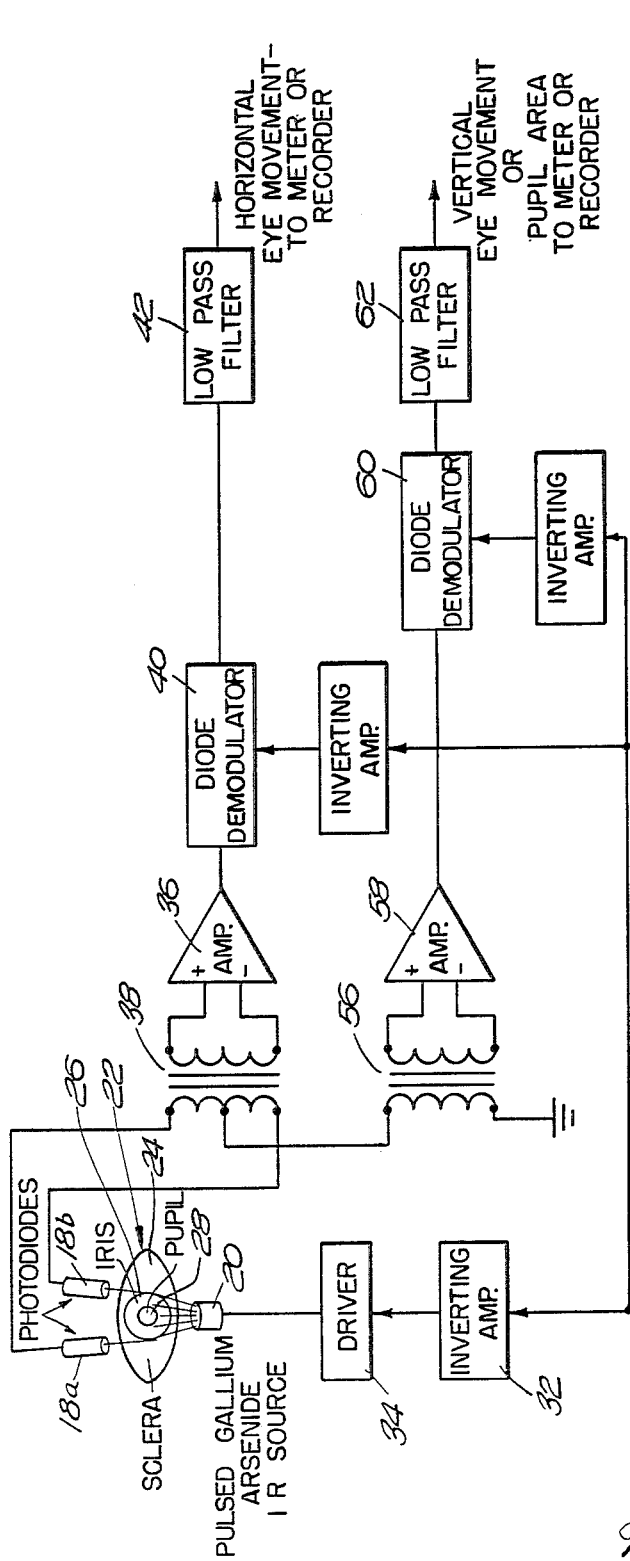
INVENTOR
Laurence R. Young
BY Joel S. Newman
Wolf, Greenfield & Hicken
ATTORNEYS

United States Patent Office 3,473,868
Patented Oct. 21, 1969

3,473,868
EYE POSITION AND MOVEMENT MONITOR
Laurence R. Young, Newton, and Joel S. Newman,
Framingham, Mass., assignors, by mesne assignments, to Space Sciences Incorporated, Waltham,
Mass., a corporation of Delaware, and Whittaker
Corporation, Los Angeles, Calif., a corporation of
California
Filed Apr. 27, 1967, Ser. No. 634,344
Int. Cl. A61b 3/10, 3/14
U.S. Cl. 351—6       6 Claims

ABSTRACT OF THE DISCLOSURE

An eye measuring instrument employing a modulated invisible light source which illuminates the eye and a pair of photocells directed to the interface of portions of the eye with different light reflecting properties. The interfaces selected move in response to eye movement or pupil area change, and the changes in the photocell outputs are a measure of the eye movement or pupil area change.

---

The present invention relates to means for monitoring eye movement and pupil area.

At the present time devices are available for photoelectrically measuring horizontal and vertical eye movement as well as pupil area, but these devices all have certain disadvantages. For example, these devices generally use an unmodulated visible light source which distracts the subject and is not easily distinguishable over ambient light such as sunlight, room lights, etc. In one technique for the measurement of horizontal eye movement, visible light illuminates portions of the boundary between the iris and sclera, and photocells are directed to the opposite boundary regions established by the eye when looking in a straight-forward position, and they measure the reflected light at each boundary as it changes with horizontal movement of the eye. This geometry has not been used for measuring vertical eye movement because of the position of the eyelid with respect to the boundary between the iris and sclera at the iris top. Therefore, in these systems only a single light sensitive device is used focused at the boundary between the sclera and the iris at the bottom. Still another undesirable feature of these arrangements for both vertical and horizontal eye movement measurement is the strong interaction or cross coupling between these signals.

The pupillometers heretofore available determine the pupil area by such means as measuring gross reflection of the eye and either do not employ modulated invisible light to achieve the advantages of the present invention, or involve complex scanning mechanisms.

One important object of this invention is to eliminate the effect of variations in ambient illumination in the photoelectric measurement of eye movement and pupil area.

Another important object of this invention is to eliminate glare and other distractions to the subject normally present when visible light is used to measure eye movement and pupil area.

And another important object of this invention is to substantially eliminate the effects of horizontal eye position upon the measurement of vertical eye movement.

And another important object of this invention is to substantially eliminate the effects of vertical eye position upon the measurement of horizontal eye movement.

Yet another important object of this invention is to provide means for effectively employing two light sensitive devices in measuring both horizontal and vertical eye movement and pupil area of a subject.

Another important object of this invention is to provide a system for measuring pupil area which is relatively insensitive to horizontal eye movement.

To accomplish these and other objects, the instrument of the present invention includes an invisible light energy source for illuminating the eye. A frame, preferably carried by the head of the subject, carries a pair of light sensitive devices which are pointed to the interface of two areas of different light reflective quality. A circuit including the light sensitive devices responds to changes in the invisible light sensed by the devices as a measurement either of eye movement or pupil area.

In accordance with one embodiment of this invention the light sensitive devices are pointed to the right and left edges of the iris and the circuit measures the difference in the light sensed by each of the devices as a measure of horizontal eye movement. In another embodiment of this invention the light sensitive devices are pointed to the lower edge of the upper eyelid which preferably is coated with a material having a low light reflectivity. The circuit measures the sum of the light reflected as an indication of vertical eye movement. In accordance with yet another embodiment of this invention, the light sensitive devices are pointed to the left and right edges of the pupil-iris boundary, and the circuit measures the sum of the light reflected to the cells as an indication of pupil area.

These and other objects and features of this invention along with its incident advantages will be better understood and appreciated from the following detailed description of several embodiments thereof, selected for purposes of illustration and shown in the accompanying drawing, in which:

FIG. 1 is a block diagram of a system for measuring eye movement and pupil area with the photocells positioned to measure horizontal eye movements;

FIG. 2 is a diagram illustrating the photocells of the system as they are positioned to measure vertical eye movement;

FIG. 3 is a diagram illustrating the photocells of the system as they are positioned to measure pupil area;

FIG. 5 is a perspective view suggesting the manner in which the photocells and light source may be mounted on an eyeglass frame to make the various measurements.

Figure 4:
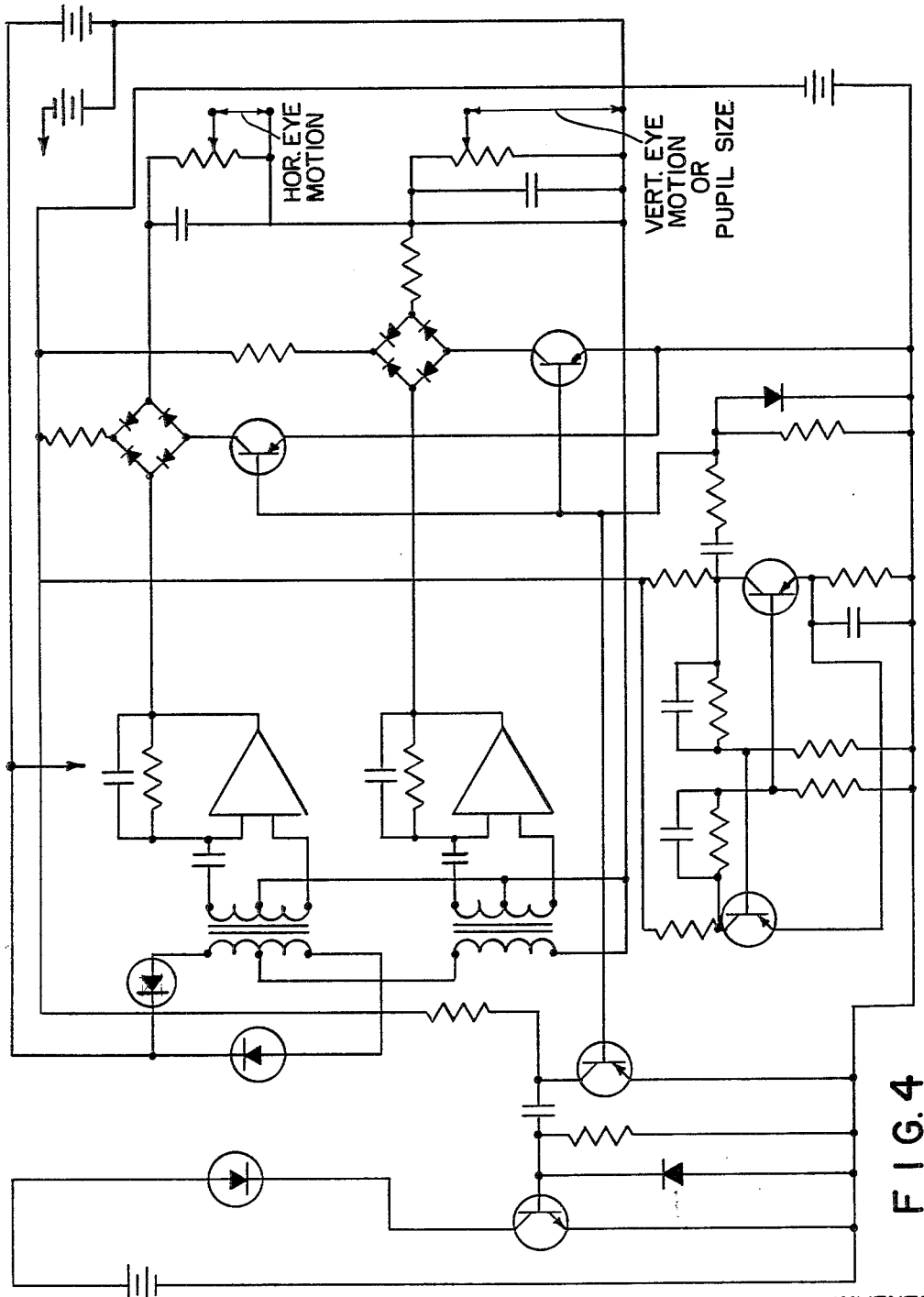
FIG. 4 is a schematic diagram of the system.

In FIG. 5 an eyeglass frame 10 is shown which includes a pair of temples 12 and lense frames 14 connected by a bridge 16, and a pair of photocells 18 are mounted on one of the lens frames 14, which sense light reflected from the portion of the eye at which they are pointed. The lens frame 14 also carries a light source 20 between the photocells 18, which provides the light to be sensed by the photocells. The manner in which the potocells and light source cooperate to accomplish the various measurements identified in the introduction is explained in connection with FIGS. 1–4.

In FIG. 1 an eye 22 is represented diagrammatically with its sclera 24, iris 26, and pupil 28. The two photocells 18 are shown to be pointed at the boundary between the sclera 24 and iris 26. It will be appreciated that the sclera has a high degree of light reflectivity while the iris to a great extent absorbs light.

The photocells 18 pointed at the boundary between the iris and sclera established when the eye is looking directly ahead will sense different amounts of light when the eye moves either left or right. Thus, when the eye moves to the left, as viewed in FIG. 1 the reflected light sensed by the left photocell 18a will be less than the light sensed when the eye looked straight ahead, while the same eye movement will cause an increase in the reflected light sensed by the right photocell 18b. Because the photocells as well as the light source to be described are mounted on the eyeglass frame 10, it will be appreciated that the system is insensitive to head movement and affords complete freedom of head movement without introducing errors into the measurements of eye position with respect to the head. In addition, this two cell arrangement minimizes the effects of vertical eye movements due to the differential connection of the photodetectors.

The light source 20 shown in FIG. 1 is a narrow band solid state gallium arsenide infrared source which is modulated at a frequency of between 1 and 10 kilocycles by an oscillator which may be an astable multivibrator 30. The multivibrator 30 is connected to the infrared source 20 by an inverting amplifier 32 and a driver 34. The modulation and the narrow spectral width of this illumination makes it easily separable from any other interfering sources of energy falling on the eye.

To measure horizontal eye movement, the difference between the two photocell output voltages is directed to an operational amplifier 36 which is AC coupled to block the effects of any steady state changes in ambient illumination. The difference in the voltages may be generated in a center tapped transformer 38 which also provides AC coupling. The amplified difference from amplifier 36, which is an amplitude modulated carrier signal, is fed to a phase sensitive detector 40, that may take the form of a diode demodulator, which produces an output signal only when the infrared source is pulsed on by the astable multivibrator 30, thus further reducing the effects of both other unwanted light falling on the photocells 18 and any other nonsynchronous noise. The output of the phase sensitive detector 40 is directed through a low-pass filter 42 to yield a smooth DC signal which is a function of horizontal eye position.

In FIG. 2 the photocells 18 are shown positioned to measure vertical eye movement as contrasted to the measurement of horizontal eye movement in the system of FIG. 1. In accordance with this invention, to measure vertical eye movement, the upper eyelid is blackened to decrease its reflectivity. The photocells 18 are pointed to the level of the lower edge of the eyelid 50 which actually follows the vertical eye movement, and consequently when the eye turns downward the lid drops. Thus, when the photocells 18 are positioned so that they are pointed at the lower edge of the eyelid in the normal position, when the eye drops, the eyelid drops also and the photocells sense a decrease in the reflected energy. The sum of the two signals generated by the photocells is a function of the vertical eye position.

In FIG. 3 the photocells 18 are positioned so that the system shown in FIG. 1 may function as a pupillometer. In this application, the two photocells are pointed at the left and right edges 52 and 54 of the pupil-iris boundary. As the pupil constricts, more light is reflected to the photocells 18 because the iris has greater reflectivity than the pupil. Thus, an increase in the light sensed by the photocells is an indication of reduction in pupil size.

When vertical eye movement or pupil area is being measured, the output signals of the two photocells 18 are summed at the transformer 56 and amplified by the operational amplifier 58 as shown in FIG. 1. The sum is then fed to phase sensitive detector 60 which, like the detector 40, may be a diode demodulator, that produces an output signal only when the infrared source 20 is pulsed on. The output of the demodulator 60 is directed through the low-pass filter 62 which like the filter 42 yields a smooth DC signal which is proportional to either vertical eye movement or pupil area, depending upon the orientation of the photocells 18. Obviously an appropriate meter may be connected to the outputs of the filters 42 and 62 to measure the signals.

The arrangement shown in FIG. 2 permits cross coupling from horizontal eye position to be cancelled to first order approximation, by the differential effect of horizontal motion on the two photocells. A similar benefit is derived in connection with the measurement of pupil area.

The schematic diagram shown in FIG. 4 is composed of well known components and is one implementation of the system shown in block diagram FIG. 1. Because it is composed of standard parts readily recognizable as representing the components of the block diagram, a detailed description of the schematic diagram is deemed unnecessary.

From the foregoing description those skilled in the art will appreciate that the objects set forth in the introduction are accomplished by the embodiment shown and described and that modifications may be made of the invention without departing from its teachings. For example, while in the foregoing embodiment the photocells and light source are mounted on the eyeglass frame, it is to be understood that the subject's head could be held in place by a bite board or some other technique, with a frame for the light and transducers so as to maintain the subject's head and the light and transducers in fixed relationship to one another. Therefore it is not intended to limit the breadth of the invention to the embodiments illustrated and described. Rather, it is intended that the scope of this invention be determined by the appended claims and their equivalents.

What is claimed is:

1. An eye measuring instrument comprising a modulated invisible light energy source positioned to direct light to the eye of a subject,
   photocells mounted to be pointed one at the left and one at the right edge of the iris at the iris-sclera boundary,
   means for maintaining the photocells in fixed relationship to the head of a subject,
   and circuit means for measuring the imbalance of the light reflected to the cells as a measure of the horizontal eye movement of the subject.

2. An eye measuring instrument as described in claim 1 further characterized by
   said cells being mounted to be pointed at the edge of the eyelid, and said circuit means adapted for measuring the sum of the light reflected to the cells as a measure of the vertical eye movement of the subject.

3. An eye measuring instrument as described in claim 1 further characterized by
   said photocells being mounted to be pointed one at the left and one at the right edge of the pupil-iris boundary,
   and said circuit means adapted for measuring the sum of the light reflected to the cells as a measure of the pupil area.

4. An eye measuring instrument comprising a modulated invisible light energy source adapted to be positioned to illuminate the eye,
   a light sensing device mounted to be directed at the interface between two portions of the eye when the eye is in the normal position and said portions having different light reflecting properties,
   a circuit including a phase sensitive detector connected to the output of the light sensing device which produces a signal only when the light source is pulsed on,
   and means for measuring the signal.

5. An eye measuring instrument as described in claim 4 further characterized by, said light sensing device being a pair of photocells each being mounted to be pointed at the interfaces of the two portions of the eye, and means for directing one of the sum or difference of the two signals to the phase sensitive detector.

6. An eye measuring instrument as described in claim 4 further characterized by, a frame adapted to be supported on the head of the subject, said light source and light sensing device being mounted on the frame.

References Cited

UNITED STATES PATENTS 3,036,568   5/1962   Stark.
3,379,885   4/1968   Nork.

DAVID SCHONBERG, Primary Examiner

P. A. SACHER, Assistant Examiner

U.S. Cl. X.R.

351—1, 7